United States Patent
Ono et al.

(10) Patent No.: US 8,443,691 B2
(45) Date of Patent: May 21, 2013

(54) VEHICLE REVERSING APPARATUS

(75) Inventors: Kazuhiko Ono, Saitama (JP); Atsuo Ota, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 829 days.

(21) Appl. No.: 12/559,024

(22) Filed: Sep. 14, 2009

(65) Prior Publication Data

US 2010/0077884 A1    Apr. 1, 2010

(30) Foreign Application Priority Data

Sep. 30, 2008  (JP) .................. 2008-254920

(51) Int. Cl.
*B60K 20/00* (2006.01)
*F16H 37/06* (2006.01)

(52) U.S. Cl.
USPC ................................ 74/473.36; 74/661

(58) Field of Classification Search .......... 74/810.1, 74/810.2, 321, 324, 332, 661
See application file for complete search history.

(56) References Cited

U.S. PATENT DOCUMENTS

| | | | | |
|---|---|---|---|---|
| 3,062,068 A * | 11/1962 | Bodkin | ............................ | 74/337 |
| 4,763,538 A * | 8/1988 | Fujita et al. | ...................... | 74/661 |
| 4,869,332 A * | 9/1989 | Fujita et al. | ................. | 180/65.22 |
| 6,267,192 B1 * | 7/2001 | Maier et al. | .................... | 180/219 |
| 6,457,381 B1 * | 10/2002 | Nonaka et al. | .................. | 74/661 |
| 6,457,391 B1 * | 10/2002 | Yamazaki et al. | .............. | 82/118 |
| 7,952,305 B2 * | 5/2011 | Fischer et al. | ................. | 318/139 |
| 2002/0038578 A1 * | 4/2002 | Nonaka et al. | ................... | 74/661 |
| 2005/0103069 A1 * | 5/2005 | Konno et al. | ................... | 70/282 |
| 2008/0099707 A1 * | 5/2008 | Yoshika et al. | ........... | 251/129.01 |
| 2009/0084350 A1 * | 4/2009 | Nishimura et al. | ........... | 123/337 |

FOREIGN PATENT DOCUMENTS

| JP | 59147143 | 8/1984 |
|---|---|---|
| JP | 2001-253384 | 9/2001 |

* cited by examiner

*Primary Examiner* — Ha D Ho
*Assistant Examiner* — Jude Agendia
(74) *Attorney, Agent, or Firm* — Squire Sanders (US) LLP

(57) ABSTRACT

A vehicle reversing apparatus includes a reverse drive gear, a reverse gear, a shifter gear, a shifter gear slide mechanism, and lost motion mechanism. The reverse drive gear is configured to rotate by a starter motor or an internal combustion engine, and the reverse gear is configured to reverse the vehicle. The shifter gear is configured to be mounted circumferentially rotatably relative to a reverse shaft and to transmit rotation of the reverse drive gear to the reverse gear. The shifter gear slide mechanism is configured to slide the shifter gear through rotation of a shifter motor to enable the shifter gear to engage the reverse drive gear and the reverse gear. The lost motion mechanism is configured to coaxially connect a rotation shaft of the shifter motor and the reverse shaft to each other.

11 Claims, 3 Drawing Sheets

VEHICLE REVERSING APPARATUS

FIELD

Embodiments of the present invention relate to reversing apparatuses for large-sized motorcycles and, more particularly, to a vehicle reversing apparatus that reverses a motorcycle using a starter motor for starting an internal combustion engine without using a running drive internal combustion engine.

BACKGROUND

Generally, a large-sized motorcycle or a leisure three-wheeled vehicle that is not easy to reverse includes a reverse speed permitting reverse rotation. The reverse speed permitting reverse rotation is provided in a speed change mechanism of a power transmission system that transmits a drive from a running drive internal combustion engine to a rear wheel. Another known arrangement allows such a vehicle to be reversed on its own using a driving force of a starter motor for starting an internal combustion engine. See, for example, Japanese Patent Laid-Open No. 2001-253384. Hereinafter referred to as Patent Document 1.

Unfortunately, however, the aforementioned arrangements in the reversing apparatus suffer from numerous problems. For example, displacement in a reverse shaft by a shifter motor involves transmission loss, because rotation of the shifter motor is transmitted to rotation of a partial worm wheel via a worm. Further, the increased number of parts used contributes to a complicated structure and a need may arise for a faulty operation detection means or the like for an operation between the partial worm wheel and the worm, which could require additional space.

SUMMARY

According to an embodiment of the present invention, a vehicle reversing apparatus is provided for reversing a vehicle by a driving force of a starter motor, which starts an internal combustion engine, or by a driving force of the internal combustion engine. The vehicle reversing apparatus includes a reverse drive gear, a reverse gear, a shifter gear, a shifter gear slide mechanism, and lost motion mechanism. The reverse drive gear is configured to be rotated by the starter motor or the internal combustion engine and the reverse gear is configured to reverse the vehicle. The shifter gear mounted circumferentially rotatably relative to a reverse shaft is configured to transmit rotation of the reverse drive gear to the reverse gear. The shifter gear slide mechanism is configured to slide the shifter gear through rotation of a shifter motor to make the shifter gear engage the reverse drive gear and the reverse gear. The lost motion mechanism is configured to coaxially connect a rotation shaft of the shifter motor and the reverse shaft to each other.

According to another embodiment of the present invention, provided is a vehicle reversing apparatus for reversing a vehicle by a driving force of a starter means or an internal combustion means. The vehicle reversing apparatus includes a reverse drive means for rotating by receiving rotating power from the starter means or the internal combustion means and a reverse means is provided for reversing the vehicle. The vehicle reversing apparatus also includes a shifter means for transmitting rotation of the reverse drive means to the reverse means. The shifter means is mounted circumferentially rotatably relative to a reverse shaft. A shifter gear slide means is provided for sliding the shifter means through rotation of a shifter motor means to enable the shifter means to engage the reverse drive means and the reverse means. A lost motion mechanism means is provided for coaxially connecting a rotation means of the shifter motor means and the reverse means to each other.

According to another embodiment of the present invention, a vehicle reversing method is provided for reversing a vehicle by a driving force of a starter motor or an internal combustion engine. The method includes rotating a reverse drive gear by the starter motor or the internal combustion engine. The vehicle is reversed using a reverse gear. The method includes transmitting, using a shifter gear, rotation of the reverse drive gear to the reverse gear. The shifter gear is mounted circumferentially rotatably relative to a reverse shaft. The method also includes sliding, by a shifter gear slide mechanism, the shifter gear through rotation of a shifter motor to enable the shifter gear to engage the reverse drive gear and the reverse gear

DESCRIPTION OF THE PREFERRED EMBODIMENTS

Some embodiments to which the present invention could be applied to will be described below with reference to FIGS. 1 through 4.

Figure 4:
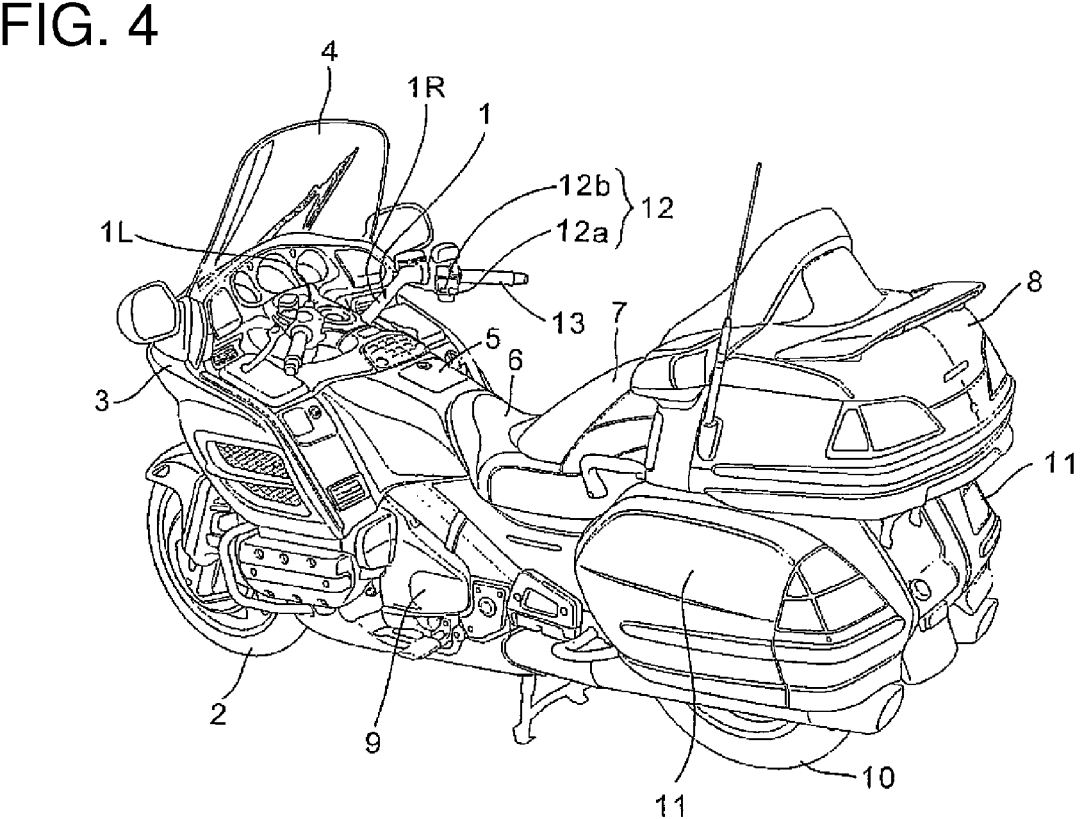
FIG. 4 is a perspective view for illustrating the motorcycle on which the vehicle reversing apparatus is mounted in accordance with an embodiment of the present invention.

FIG. 4 is a perspective view for illustrating a motorcycle on which a vehicle reversing apparatus is mounted according to an embodiment of the present invention. According to FIG. 4, a steering handlebar (hereinafter referred to simply as the "handlebar") 1 can be fixed to an upper portion of a front fork (not shown) that journals a front wheel 2 at a lower end thereof. The handlebar 1 includes a left handlebar 1L and a right handlebar 1R. A switch panel 12 disposed near a handlebar grip 13 of the right handlebar 1R can include a starter/reverse switch 12a and a reverse shifter switch 12b. Specifically, the starter/reverse switch 12a can start a starter motor for starting an engine or reversing a vehicle. The reverse shifter switch 12b can change the function of the starter motor between starting and reversing. A front fairing 3 for covering an indicator panel and a lighting device can be disposed in front of the handlebar 1. A windshield 4 can be mounted at an upper portion of the front fairing 3.

A fuel tank 5, a rider seat 6, a passenger seat 7, and a rear box 8 are disposed in sequence behind the front fairing 3 toward the rear of the vehicle. An engine, for example an internal combustion engine, 9 is disposed downwardly of the fuel tank 5 and a rear wheel 10 is disposed downwardly of the rear box 8. Side boxes 11 and 11 are disposed so as to cover upper portions on the right and left of the rear wheel 10.

Arrangements of a shifter gear slide mechanism in the vehicle reversing apparatus that forms a characteristic structural member of the present invention will be described below with reference to FIG. 1.

The vehicle reversing apparatus can include a reverse drive gear 33, a reverse gear 14B, a shifter gear 18A, a shifter gear slide mechanism 18, a shifter motor 19, and a lost motion mechanism 40. The reverse drive gear 33 can be rotated by a starter motor 17 for starting the engine 9 and the reverse gear 14B can reverse the vehicle. The shifter gear 18A can be mounted on a reverse shaft 23 for transmitting the rotation of the reverse drive gear 33 to the reverse gear 14B. The shifter gear slide mechanism 18 can cause the shifter gear 18A to engage the reverse drive gear 33 or the reverse gear 14B. The shifter motor 19 can rotate a shifter motor rotation shaft 20 disposed coaxially relative to the reverse shaft 23 in a forward or backward direction. The lost motion mechanism 40 connects the reverse shaft 23 with the shifter motor rotation shaft 20.

The starter motor 17 can be used for both starting the engine 9 and a drive for reversing the vehicle. The starter motor 17 is structured to rotate in one direction only.

The shifter gear 18A can be mounted circumferentially rotatably and axially movably relative to the reverse shaft 23 supported by a crankcase and a rear case (not shown). The shifter gear 18A is structured to be in mesh with the reverse gear 14B, which is a driven gear fixed to a final speed shaft 14A of a transmission in a condition in which the vehicle can be reversed (in a reverse position).

The reverse drive gear 33 can be connected to a shaft 17*a* of the starter motor 17. The shaft 17*a* of the starter motor 17 has a leading end that is in splined connection via a one-way clutch (not shown) with a shaft of a starter drive gear (not shown). The shaft of the starter gear can transmit rotation of the starter motor 17 to a crankshaft.

The shifter gear slide mechanism 18 axially slides the shifter gear 18A through the rotation of the shifter motor 19 relative to the reverse shaft 23 whose axial position can be fixed. A cam 25 that is axially slidable can be mounted on one end of the reverse shaft 23. For example, the cam 25 is structured to be axially slidable relative to the reverse shaft 23 with its rotation restricted by being engaged with the crankcase via a pin 26 fixed to the crankcase or the rear case. The cam 25 also includes an arcuate cam hole 25*a* that is inclined upwardly toward the right relative to a circumference of a cam face. A pin 27 fixed in a protruding condition relative to the reverse shaft 23 can be a loose fit in the cam hole 25*a*.

The shifter motor 19 can be structured to be driven forward or backward, as selected, relative to a motor power supply 50. Referring to FIG. 1, the shifter motor 19 can be mounted on a side surface position of the engine 9 (see FIG. 2) such that the shifter motor rotation shaft 20 extends in parallel with the shaft 17*a* of the starter motor 17 and the final speed shaft 14A of the transmission.

In this example, the lost motion mechanism 40 includes a coil-like spring 43 that is disposed so as to hang across a plate 41 and a plate 42. More specifically, the plate 41 is formed, for example, into a disc shape fixed to an end of the reverse shaft 23. The plate 42 can be a disc disposed coaxially relative to the reverse shaft 23 and fixed to an end of the shifter motor rotation shaft 20 of the shifter motor 19. The coil-like spring 43 has its ends fixed to the plate 41 and the plate 42. Thus, the reverse shaft 23, the shifter motor rotation shaft 20, and the coil-like spring 43 can be coaxially disposed to form the lost motion mechanism 40.

When the shifter motor rotation shaft 20 and the plate 42 rotate in one direction, the lost motion mechanism 40 can rotate the plate 41 in the same direction accordingly. If resistance of some sort prevents the plate 41 from rotating, the lost motion mechanism 40 can accumulate an urge in the direction of rotation in the coil-like spring 43.

Figure 1:
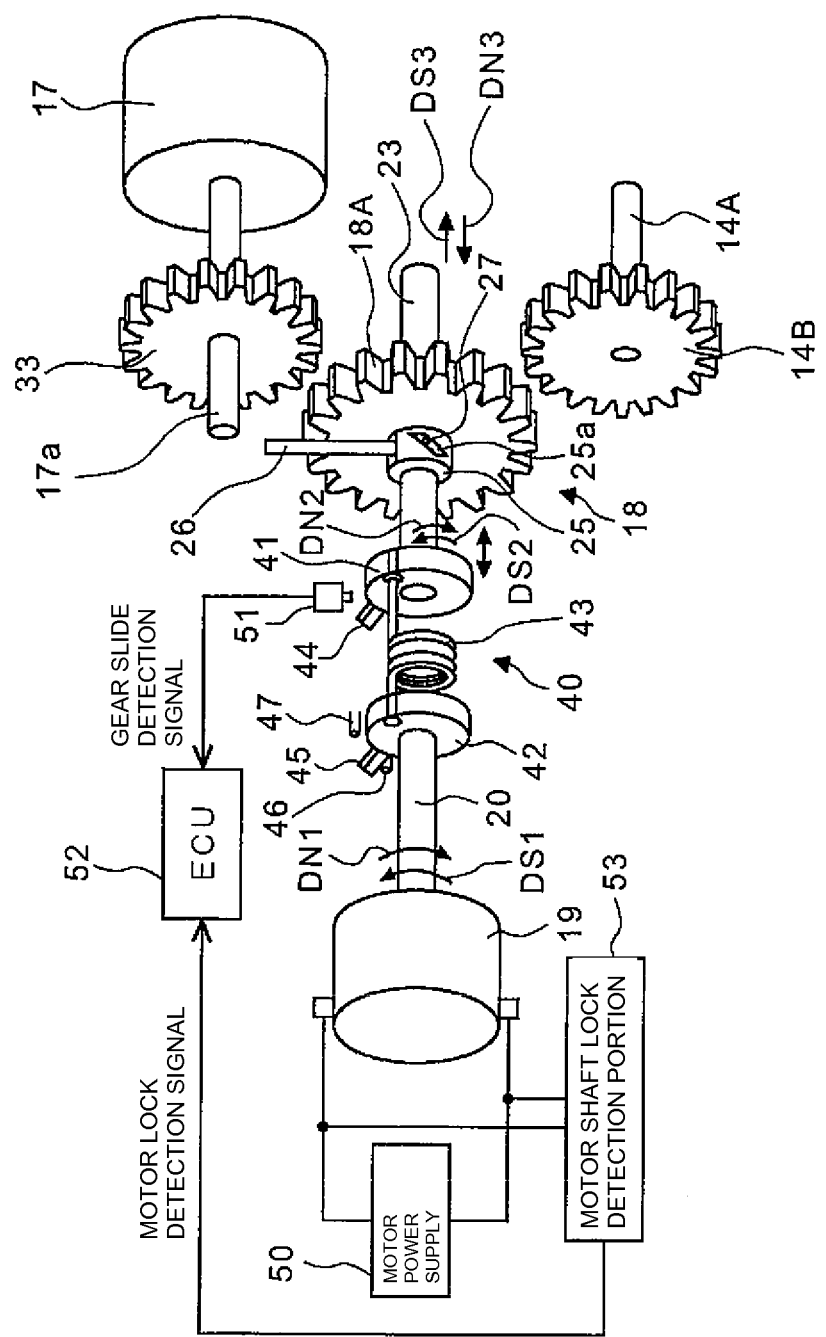
FIG. 1 is a schematic diagram showing an arrangement of a vehicle reversing apparatus in accordance with an embodiment of the present invention.
Figure 2:
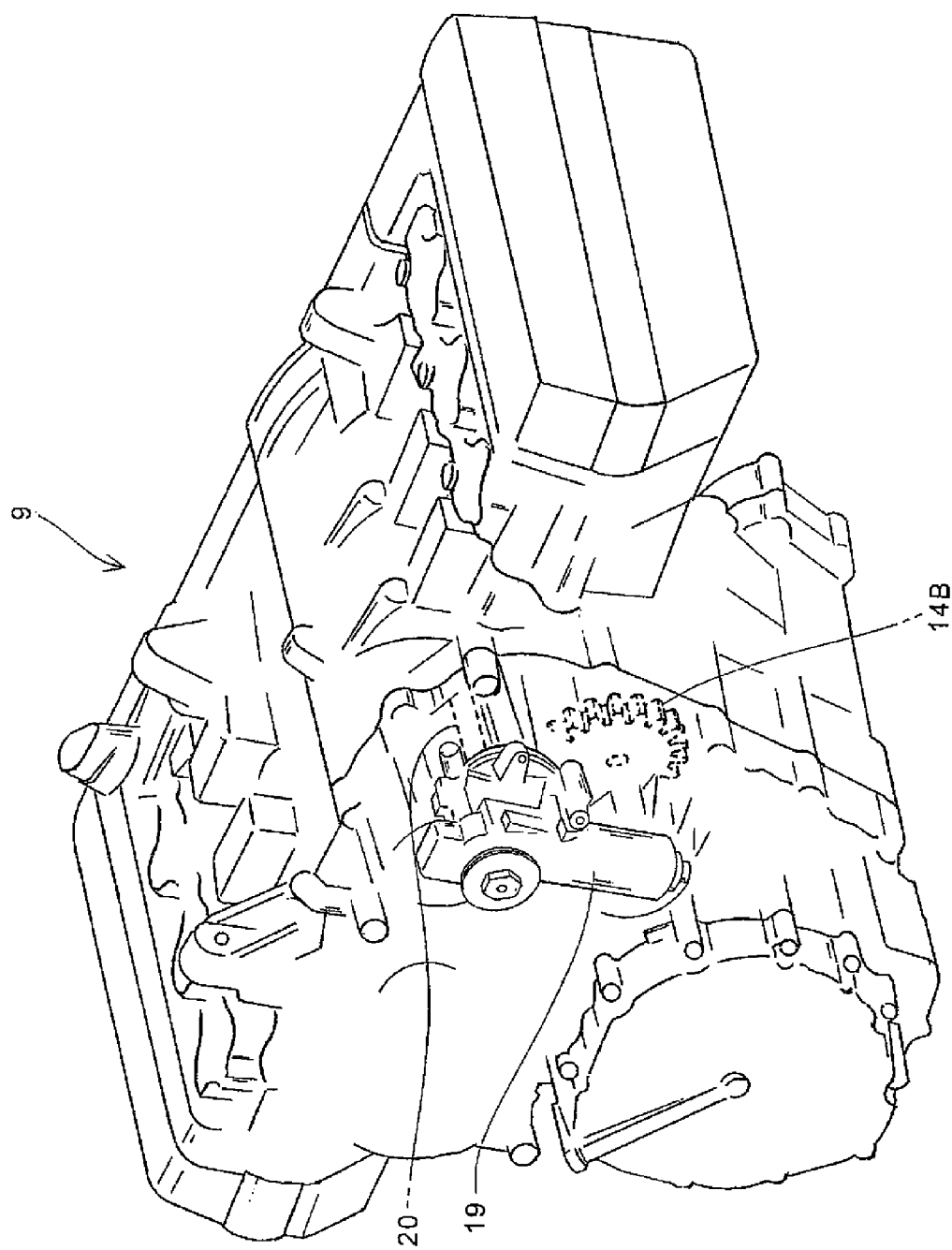
FIG. 2 is a perspective view for illustrating the appearance of an engine (an internal combustion engine) with a shifter motor mounted on a side surface thereof in accordance with an embodiment of the present invention.

When, for example, the shifter motor rotation shaft 20 and the plate 42 rotate in a counterclockwise direction, the motion of the cam 25 and the pin 27 allows the cam 25 and the shifter gear 18A to move in a direction of meshing with the reverse drive gear 33 and the reverse gear 14B (to move in the rightward direction in FIG. 1). However, it should be noted that the cam 25 and the shifter gear 18A may not be able to move smoothly in the rightward direction depending on positions of the shifter gear 18A and the reverse drive gear 33 or the reverse gear 14B (gear faces may be in abutment with each other). When the cause inhibiting the smooth movement is eliminated, the urge of the coil-like spring 43 can act on the plate 41 in the counterclockwise direction to cause the cam 25 and the shifter gear 18A to move in the rightward direction quickly to be in mesh with the relevant gear.

A protrusion 44 can be formed on a peripheral surface of the plate 41 and a position sensor 51 can detect the position of the protrusion 44. Specifically, when the plate 41 rotates to a predetermined angular position, the position sensor 51 can detect the protrusion 44 and can transmit a gear slide detection signal to a control unit 52. This allows completion of the movement of the shifter gear 18A to a predetermined position (at which the shifter gear 18A meshes with the reverse gear 14B) as a result of a sliding motion of the cam 25 relative to the reverse shaft 23 to be detected. The foregoing detection causes a reverse indicator lamp to light up of an indicator inside the indicator panel (not shown) near the handlebar 1 to notify the rider of the completion of the event.

In this embodiment, a protrusion 45 is formed on a peripheral surface of the plate 42 and pins 46 and 47 are fixed inside the crankcase at positions to sandwich the protrusion 45. When the shifter motor rotation shaft 20 rotates, the protrusion 45 abuts on the pin 46 or 47 so that the rotation of the plate 42 can be restricted.

A motor shaft lock detection portion 53 that detects a driving current at all times can be connected to the shifter motor 19. In this embodiment, the motor shaft lock detection portion 53 can detect a lock current when the rotation of the plate 42 is restricted and can output a motor lock detection signal to the control unit 52. The control unit 52 can control drive of the shifter motor 19, including stop and start of rotation in the forward/backward direction, based on the gear slide detection signal from the position sensor 51 and the motor lock detection signal from the motor shaft lock detection portion 53.

The operation of, for example, the shifter gear slide mechanism 18 will be described below. When the shifter motor 19 is driven, the shifter motor rotation shaft 20 rotates in the direction of arrow DN1 or arrow DS1. For example, rotation of the shifter motor rotation shaft 20 and the plate 42 is transmitted to the plate 41 via the coil-like spring 43 of the lost motion mechanism 40, thus rotating the reverse shaft 23 in a direction of arrow DN2 or arrow DS2.

The rotation of the reverse shaft 23 can result in the following. For example, as the pin 27 is guided along the cam hole 25*a*, the cam 25 moves linearly in a direction of arrow DN3 or arrow DS3 relative to the reverse shaft 23 and accordingly the shifter gear 18A makes a slide motion.

FIG. 1 shows a condition in which the shifter gear 18A is in a midway position to be placed in a reverse position of reversing the vehicle. For example, the condition is immediately before the shifter gear 18A meshes with the reverse gear 14B of a transmission 14. This condition can be achieved as a result of a number of operations. For example, the shifter motor rotation shaft 20 rotates in the direction of arrow DS1, displacing the cam 25 in the direction of arrow DS3 relative to the reverse shaft 23. Thereafter, the shifter gear 18A meshes with the reverse gear 14B of the transmission 14 and the reverse drive gear 33 (reverse position). When the starter motor 17 is driven in this reverse position, the rotation of the starter motor 17 can be transmitted to the reverse gear 14B via the reverse drive gear 33 and the shifter gear 18A, so that the vehicle is reversed.

When the starter motor 17 is to be disconnected from the reverse gear 14B, and specifically, when a neutral position is selected, the shifter motor rotation shaft 20 can be rotated in the direction of arrow DN1 to displace the cam 25 in the direction of arrow DN3. As a result, the shifter gear 18A can disengage from the reverse drive gear 33 and the reverse gear 14B.

Figure 3:
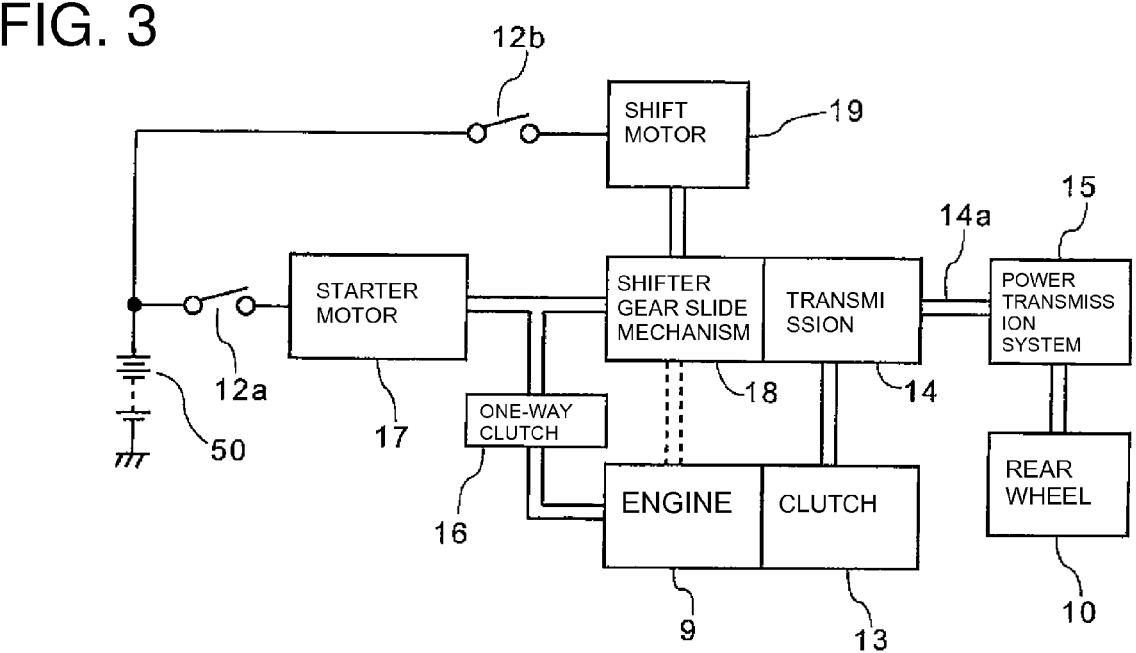
FIG. 3 is a block diagram showing a power transmission system of a motorcycle mounted with the vehicle reversing apparatus in accordance with an embodiment of the present invention.

FIG. 3 is a block diagram showing the power transmission system of the motorcycle mounted with the above-described vehicle reversing apparatus. Referring to FIG. 3, the engine 9 is connected to the transmission 14 of a multistage gear type via a clutch 13 and the transmission 14, which has an output shaft 14a connected to the rear wheel 10 via a power transmission system 15, includes a sprocket and a chain. When the engine 9 is operating and the clutch 13 is connected, the rear wheel 10 is rotated according to the direction of rotation and a reduction ratio corresponding to the gear position of the transmission 14.

In this embodiment, the starter motor 17 is connected to the crankshaft (not shown) of the engine 9 via a one-way clutch 16 and is also connected to the final speed shaft (not shown) of the transmission 14 via the shifter gear slide mechanism 18. The one-way clutch 16 can intervene for transmitting a starting force from the starter motor 17 to the engine 9. The shifter gear slide mechanism 18 can connect or disconnect the starter motor 17 relative to the final speed shaft of the transmission 14. The shifter motor 19 functions as an actuator for controlling the shifter gear slide mechanism 18. The starter motor 17 can be connected to the motor power supply (battery) 50 via the starter/reverse switch 12a, a relay, and other parts (not shown). In this embodiment, the motor power supply 50 can start the starter motor 17 and the starter motor 17 can start the engine 9 or reverse the vehicle. The shifter motor 19 connected to the motor power supply (battery) 50, via the reverse shifter switch 12b, a relay, and other parts (not shown), can switch the starter motor 17 between two modes of starting and reversing. In the embodiment of the present invention, the starting starter motor 17 is used as a driving force for reversing. This arrangement offers an advantage of reversing the vehicle at even lower speeds as compared with an arrangement of using a running drive internal combustion engine for reversing.

The vehicle is reversed in the following procedure using the vehicle reversing apparatus having the arrangements as described heretofore. Note that the shifter gear 18A can be in the neutral position in the initial condition. The starter/reverse switch 12a can be pressed to rotate the starter motor 17, thereby starting the engine 9. At this time, the transmission 14 is in the neutral state. The reverse shifter switch 12b can then be pressed to drive the shifter motor 19, so that the shifter gear 18A meshes with the reverse drive gear 33 and the reverse gear 14B to select the reverse position. The starter/reverse switch 12a is pressed to rotate the starter motor 17. The rotation of the starter motor 17 can then be transmitted to the reverse gear 14B, so that the vehicle is reversed. The vehicle reverses as long as the starter/reverse switch 12a is held down. However, the vehicle is stopped when the starter/reverse switch 12a is released. When the vehicle is brought to a stop and the reverse shifter switch 12b is then pressed again, the shifter gear 18A and the reverse gear 14B are disengaged from each other and the neutral position can be established.

The present invention has been described with particular reference to the preferred embodiments, in which the starting starter motor 17 connected to the shaft 17a can be used to provide the driving force for the reversing apparatus. Numerous other embodiments are possible, while remaining within the spirit and scope of the invention. For example, an arrangement may be such that the driving force is given by connecting the shaft 17a connected to the reverse drive gear 33 in FIG. 1 to a rotation shaft of the engine (internal combustion engine) 9, instead of to the starter motor 17. Referring to the block diagram shown in FIG. 3, the shifter gear slide mechanism 18 can connect to the engine 9 and the transmission 14, so that the driving force of the engine 9 drives the rear wheel 10 for reversing the vehicle via the output shaft 14a of the transmission 14 and the power transmission system 15.

As described in each of the foregoing embodiments, the shifter motor rotation shaft 20 of the shifter motor 19 and the reverse shaft 23 are coaxially connected with each other via the lost motion mechanism 40, which includes the coil-like spring 43. The rotation of the shifter motor 19 therefore can directly rotate the reverse shaft 23, which minimizes transmission loss and efficiently transmits the drive of the shifter motor 19 to the side of the reverse shaft 23. The direct transmission of the rotation of the shifter motor 19 to the reverse shaft 23 helps reduce the number of parts used, thus realizing a simplified structure. The arrangement can also allow the shifter motor 19 to be mounted on a side of the engine (internal combustion engine) 9 contributing to a compactly formed entire reversing apparatus including the engine.

In accordance with an embodiment of the present invention, a vehicle reversing apparatus is provided to reverse a vehicle using a driving force of a starter motor for starting an internal combustion engine or of the internal combustion engine. The vehicle reversing apparatus can include a reverse drive gear, a shifter gear, and a shifter gear slide mechanism. The reverse drive gear can be rotated by the starter motor or the internal combustion engine. The reverse gear can reverse the vehicle and the shifter gear can be mounted circumferentially rotatably relative to a reverse shaft. The shifter gear can transmit rotation of the reverse drive gear to the reverse gear. A shifter gear slide mechanism can slide the shifter gear through rotation of a shifter motor in order to enable the shifter gear to engage the reverse drive gear and the reverse gear. A rotation shaft of the shifter motor and the reverse shaft can be coaxially connected to each other via a lost motion mechanism.

In accordance with an embodiment of the present invention, the lost motion mechanism includes a coil-like spring and the shifter motor is disposed on a side surface of the internal combustion engine.

In accordance with an embodiment of the present invention, the lost motion mechanism can coaxially connect the rotation shaft of the shifter motor with the reverse shaft. The rotation of the shifter motor can therefore directly rotate the reverse shaft, which minimizes transmission loss. The direct transmission of the rotation of the shifter motor to the reverse shaft can also reduce the number of parts used, thus realizing a simplified structure.

In accordance with an embodiment of the present invention, the lost motion mechanism includes the coil-like spring disposed coaxially relative to the rotation shaft of the shifter motor and the reverse shaft to permit direct connection.

In accordance with an embodiment of the present invention, because the shifter motor is disposed on the side surface of the internal combustion engine, the entire reversing apparatus including the internal combustion engine can therefore be compactly formed.

DESCRIPTION OF REFERENCE SYMBOLS

1: Handlebar
1L: Left handlebar
1R: Right handlebar
5: Fuel tank
6: Rider seat
9: Engine (internal combustion engine)
12: Switch panel
12a: Starter/reverse switch
12b: Reverse shifter switch
13: Handlebar grip
14: Transmission
14B: Reverse gear
17: Starter motor
18: Shifter gear slide mechanism
18A: Shifter gear
19: Shifter motor
20: Shifter motor rotation shaft
23: Reverse shaft
25: Cam
27: Pin
33: Reverse drive gear
40: Lost motion mechanism
41, 42: Plate
43: Coil-like spring
50: Motor power supply (battery)
51: Position sensor
52: Control unit
53: Motor shaft lock detection portion

We claim:

1. A vehicle reversing apparatus for reversing a vehicle by a driving force of a starter motor configured to start an internal combustion engine, or by a driving force of the internal combustion engine, the vehicle reversing apparatus comprising:
 a reverse drive gear configured to be rotated by the starter motor or the internal combustion engine;
 a reverse gear configured to reverse the vehicle;
 a shifter gear mounted circumferentially rotatably relative to a reverse shaft, the shifter gear configured to transmit rotation of the reverse drive gear to the reverse gear;
 a shifter gear slide mechanism configured to slide the shifter gear through rotation of a shifter motor to enable the shifter gear to engage the reverse drive gear and the reverse gear; and
 a lost motion mechanism configured to coaxially connect a rotation shaft of the shifter motor and the reverse shaft to each other.

2. The vehicle reversing apparatus according to claim 1, wherein
 the lost motion mechanism comprises a coil-like spring.

3. The vehicle reversing apparatus according to claim 1, wherein
 the shifter motor is disposed on a side surface of the internal combustion engine.

4. The vehicle reversing apparatus according to claim 1, wherein the shifter gear slide mechanism is connected to the internal combustion engine and a transmission so the driving force of the internal combustion engine drives the rear wheel to reverse the vehicle via an output shaft of the transmission and a power transmission system.

5. A vehicle reversing apparatus for reversing a vehicle by a driving force of a starter means or an internal combustion means, the vehicle reversing apparatus comprising:
 reverse drive means for rotating by receiving rotating power from the starter means or the internal combustion means;
 reverse means for reversing the vehicle;
 shifter means for transmitting rotation of the reverse drive means to the reverse means, wherein the shifter means is mounted circumferentially rotatably relative to a reverse shaft;
 shifter gear slide means for sliding the shifter means through rotation of a shifter motor means to cause the shifter means to engage the reverse drive means and the reverse means; and
 lost motion mechanism means for coaxially connecting a rotation means of the shifter motor means and the reverse means to each other.

6. The vehicle reversing apparatus according to claim 5, wherein the lost motion mechanism means comprises a coil-like spring means.

7. The vehicle reversing apparatus according to claim 5, wherein the shifter motor means is disposed on a side surface of the internal combustion means.

8. The vehicle reversing apparatus according to claim 5, wherein shifter gear slide means is connected to the internal combustion means and a transmission means so the driving force of the internal combustion means drives the rear wheel to reverse the vehicle via an output shaft means of the transmission means and a power transmission system means.

9. A vehicle reversing method for reversing a vehicle by a driving force of a starter motor or an internal combustion engine, the vehicle reversing method comprising:
 rotating a reverse drive gear by the starter motor or the internal combustion engine;
 reversing, by a reverse gear, the vehicle;
 transmitting, by a shifter gear, rotation of the reverse drive gear to the reverse gear, wherein the shifter gear is mounted circumferentially rotatably relative to a reverse shaft; and
 sliding, by a shifter gear slide mechanism, the shifter gear through rotation of a shifter motor to enable the shifter gear to engage the reverse drive gear and the reverse gear,
 wherein the sliding comprises coaxially connecting a rotation shaft of the shift motor and the reverse shaft to each other.

10. The vehicle reversing method according to claim 9, wherein the sliding comprises sliding the shifter gear through the rotation of the shifter motor being disposed on a side surface of the internal combustion engine.

11. The vehicle reversing method according to claim 9, further comprising:
 driving, by the driving force of the internal combustion engine, the rear wheel of the vehicle to reverse the vehicle via an output shaft of a transmission and a power transmission system, wherein the shifter gear slide mechanism is connected to the internal combustion engine and the transmission.

* * * * *